United States Patent [19]
Laney

[11] 3,723,736
[45] Mar. 27, 1973

[54] MULTIPLE SAMPLE COINCIDENCE COUNTER

[75] Inventor: Barton H. Laney, Deerfield, Ill.

[73] Assignee: Nuclear-Chicago Corporation, Des Plaines, Ill.

[22] Filed: May 11, 1971

[21] Appl. No.: 142,292

[52] U.S. Cl. .................. 250/71.5 R, 250/106 SC
[51] Int. Cl. ............................................. G01t 1/20
[58] Field of Search .............. 250/71.5 R, 106 SC

[56] References Cited

UNITED STATES PATENTS

| | | | |
|---|---|---|---|
| 3,399,302 | 8/1968 | Carrell | 250/71.5 R |
| 3,488,497 | 1/1970 | Utting | 250/106 SC X |
| 3,539,806 | 11/1970 | Humphrey | 250/71.5 R |

Primary Examiner—Archie R. Borchelt
Attorney—Lowell C. Bergstedt, Walter C. Ramm, Charles H. Thomas, Jr. and Helmuth A. Wegner

[57] ABSTRACT

In a liquid scintillation coincidence counting apparatus, the improvement wherein multiple radioactive samples are analyzed simultaneously using a counting chamber divided into sections by partition means. Each section of the chamber accomodates a sample and is in visual communication with at least two and less than all of the photomultiplier tubes. The coincidence detection system passes electrical pulses only when coincident electrical pulses are received from all of the photomultiplier tubes in visual communication with a single section of the chamber.

16 Claims, 8 Drawing Figures

INVENTOR.
BARTON H. LANEY

INVENTOR.
BARTON H. LANEY

INVENTOR.
BARTON H. LANEY

FIG. 7

INVENTOR.
BARTON H. LANEY

MULTIPLE SAMPLE COINCIDENCE COUNTER

This invention relates to an improved liquid scintillation coincidence counting apparatus. More particularly, multiple radioactive samples are analyzed simultaneously using a counting chamber divided into sections by a partition means. Each section of the chamber accomodates a sample and is in visual communication with at least two and less than all of the photomultiplier tubes. The coincidence detection system passes electrical pulses only when coincident electrical pulses are received from all of the photomultiplier tubes in visual communication with a single isolated section of the chamber.

BACKGROUND OF THE INVENTION

Liquid scintillation counting devices are in widespread use for measuring and recording the radioactive properties of sample specimens. In a liquid scintillating system, a substance, frequently tissue from a biological organism, is liquified either in suspension or in solution and is placed in a small sample vial along with a scintillating liquid. The vial is then viewed by two photomultiplier tubes. If the organism under study has at one time injested a quantity of a radioactive substance, traces of this radioactive substance will be present in the liquified specimen. The presence of this radioactive substance causes radioactive events to occur, such as the emission of beta rays or gamma rays. When these beta or gamma rays strike the active molecules in the scintillating liquid, the scintillating liquid will emit flashes of light. These light flashes are received by two photomultiplier tubes which generate electrical pulses that are amplified and recorded. A coincidence detection system allows recordation of electrical pulses from the photomultiplier tubes only if such pulses occur in coincidence. Such an arrangement largely eliminates erroneous recordings due to spurious discharges in either of the photomultiplier tubes alone.

In the context of laboratory analysis heretofore mentioned, and in other uses, large numbers of sample vials frequently must be analyzed. Liquid scintillating systems have been devised which automatically convey the vials to an enclosed viewing chamber using an elevator that lowers the vials from a loading station into the viewing chamber. Once analyzed, the sample vials are returned to the loading station by means of the elevator, and the sample chain is advanced one position. The conventional systems currently in use accomodate only one vial at a time, however. Despite the automatic conveying systems, the time consummed in analyzing a large number of samples is still inordinately large. By virtue of the sheer volume of analysis work that must be done, there is a pressing need to reduce the required time necessary to process a large number of sample vials.

SUMMARY OF THE INVENTION

Accordingly, it is an object of the invention to provide a liquid scintillating coincidence counting system with the capability of processing a plurality of samples simultaneously. Using the technique disclosed herein, two or any larger number of vials may be processed simultaneously. This increased volume handling capability is achieved without a complete duplication in the number of photomultiplier tubes and associated circuitry required. That is, the number of photomultiplier tubes is necessary increased only 50 percent at the most (where only two samples are analyzed simultaneously) when compared with a duplicated system. This savings of time and expense is achieved through the unique interaction of photomultiplier tubes achieved in the apparatus of this invention. Through appropriate conveying and positioning means, two or any greater number of samples may be analyzed in the time that it takes to analyze one sample (the sample with the lowest count rate) in conventional liquid scintillating counting systems. The multiple sample counting apparatus disclosed herein has several distinct advantages over duplicate conventional systems. Among the advantages in processing a given number of samples are the reduced number of photomultiplier tubes required; the reduced amount of total shielding required; the smaller mass of the total processing system; and sharing of sample changing mechanisms and external standard mechanisms.

Another object of a preferred embodiment of this invention is the provision of a system for detecting and separately registering accidentally coincident pulses from the photomultiplier tubes, as reproduced on a statistical basis. These accidentally coincident pulses do not reflect actual radioactive events, but instead represent accidentally coincident spontaneous discharges in the photomultiplier tubes.

Further objects that are achieved through the use of the preferred embodiments of this present invention include the provision of time correction in counting, rejection of coincidence of photomultiplier tubes lacking visual communication with a common isolated section, and selective rejection of unanimously coincident photomultiplier tube pulses.

Because the coincidence detection system in a liquid scintillation counting device can process only one event at a time, subsequent coincident pulses generated by scintillations occurring within the processing time of previous events must necessarily remain unrecorded. Because the coincidence detecting system and the pulse registration system are not duplicated for each sample being analyzed, these components remain in the processing mode a greater percentage of the analysis time then do corresponding coincident detection and pulse registration systems in conventional liquid scintillating devices. For this reason it is particularly important to correct the timing mechanism associated with the liquid scintillating system in order to achieve an accurate measurement of counts per unit time. This is achieved in a preferred embodiment of the present invention by incorporating a timing device and a dead time correcting means into the liquid scintillation counting device.

Because of the unique construction of the liquid scintillation counting device of this invention, there is a contrast in the interpretation of coincident pulses from more than two photomultiplier tubes as compared with a similar occurrence in conventional liquid scintillation coincident counting systems. The simultaneous appearance of pulses from photomultiplier tubes lacking direct visual communication with a single sample is an unrecognizable event and the data resulting therefrom may be disgarded. This is accomplished by the insertion of a coincidence blocking means between the coincidence detection system and the pulse registration system. This coincidence blocking means prevents coincident signals from photomultiplier tubes lacking visual communication with a single sample from being recorded. This device may be further modified to form a selective blocking means in still a further refinement of the invention. While it is normally undesirable to record unanimous pulses or pulses from photomultiplier tubes not directly exposed to a common sample, a polling of these types of pulses will frequently reveal the probable origin of the event in question. Moreover, it may be possible to determine which of the photomultiplier tubes have contributed the erroneous pulses. This situation may arise when a scintillation occurs in one of the samples being analyzed. The event may be recorded by the two appropriate photomultiplier tubes associated with that sample, but the scintillation may also be reflected from one of these appropriate photomultiplier tubes into the photosensitive faces of other photomultiplier tubes. In this event, inappropriate photomultiplier tubes discharge simultaneously with the appropriate photomultiplier tubes. However, the discharges occurring in the inappropriate photomultiplier tubes are of a much smaller magnitude than those in the appropriate photomultiplier tubes due to the energy lost by the scintillation in being reflected from one photomultiplier tube to another. The selective blocking means which may be utilized in preferred embodiments of this invention compares the strength of the electrical pulses from the various tubes. If the smallest pulse from one of the photomultiplier tubes is much smaller than the second smallest pulse from any of the other photomultiplier tubes, an event is recorded as having occurred in the samples scanned by the two photomultiplier tubes which emitted the strongest pulses. The weaker pulses from the other photomultiplier tubes are rejected as crosstalk signals.

As previously discussed, one further feature of this invention is a system for detecting accidental coincidences. The number of accidental coincidences is statistically determined and recorded on a separate counting device. Accidental coincidences occur when separate, spurious discharges in the photomultiplier tubes, which would otherwise not be recorded, coincide in time and are erroneously recorded as a true radioactive event. The number of accidental coincidences that occur may be statistically determined by generating a duplicate signal from a photomultiplier tube each time the photomultiplier tube discharges. This duplicate signal is not processed along with the true signal, but is introduced at the input of a separate accidental coincidence detecting and pulse registration system. The duplicate signal will ordinarily fail to pass through this system for lack of coincidence. However, should a spurious discharge occur in another interconnected photomultiplier tube, and should this spurious discharge coincide within the resolving time with the duplicate signal, the two signals together will be registered as an accidental coincidence. From a probability analysis it can be seen that the number of accidental coincidences registered due to the generation of the duplicate pulse is statistically equal to the number of accidental coincidences registered in the total pulse registration means due to the original pulse. The number of true events may be obtained by merely subtracting the reading of the accidental pulse register from the reading of the main pulse register, either manually or automatically. The provision of a system for accidental pulse correction is particularly valuable in a system such as that disclosed herein where more than two photomultiplier tubes are used in the system, since the probability of accidentally coincident discharges from two photomultiplier tubes increases with the addition of each photomultiplier tube. Similarly, accidental coincidence between scintillations in two different samples increases with the number of samples and the sample activity.

In a broad aspect this invention is, in a liquid scintillating coincidence counting apparatus comprising a counting chamber for receiving samples to be measured, photomultiplier tubes located adjacent to said chamber for producing electrical pulses responsive to energy received from scintillations occurring in the samples, coincidence detection means coupled to said photomultiplier tubes for passing electrical pulses when coincident pulses are received from at least two of said photomultiplier tubes, and pulse registration means connected to said coincidence detection means for recording pulses received therefrom. The improvement wherein partition means divide said chamber into at least two isolated sections and each of said isolated sections of said chamber simultaneously accomodates a separate sample and is in visual communication with at least two and less than all of said photomultiplier tubes, and said coincidence detection means passes electrical pulses only when coincident electrical pulses are received from all of the photomultiplier tubes in visual communication with a single isolated section of said chamber. If the chamber is divided into two sections, three photomultiplier tubes must be used in order to provide coincidence counting. If any greater number of isolated sections are formed, the number of photomultiplier tubes will necessarily at least equal the number of isolated sections.

BRIEF DESCRIPTION OF THE DRAWINGS

This invention may be more fully explained and the preferred embodiments depicted in the accompanying drawings in which.

DETAILED DESCRIPTION OF THE DRAWINGS

Figure 1:
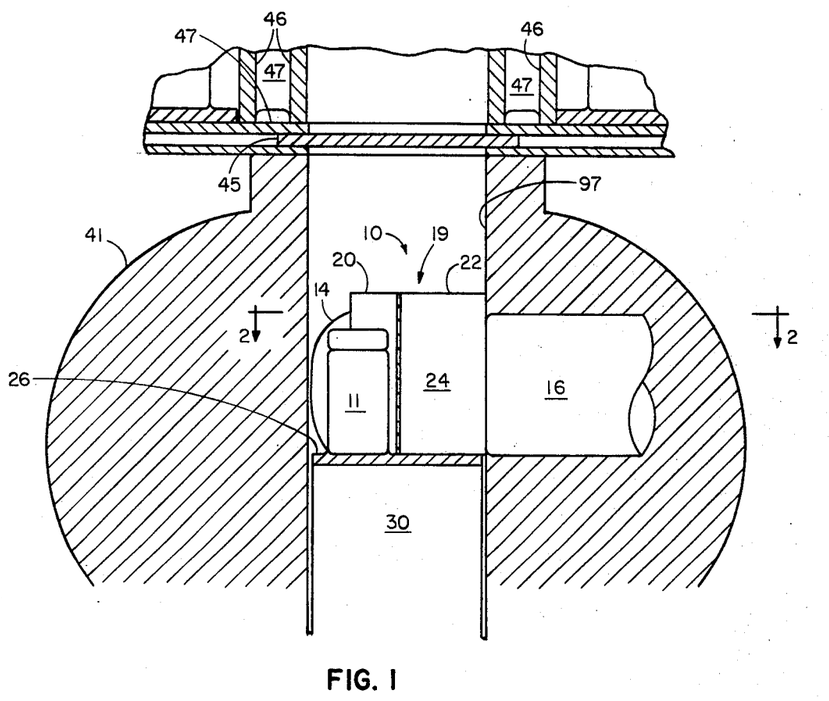
FIG. 1 is a sectional elevational view taken along the lines 1—1 of a portion of a liquid scintillation counting apparatus illustrated in FIG. 2.
Figure 2:
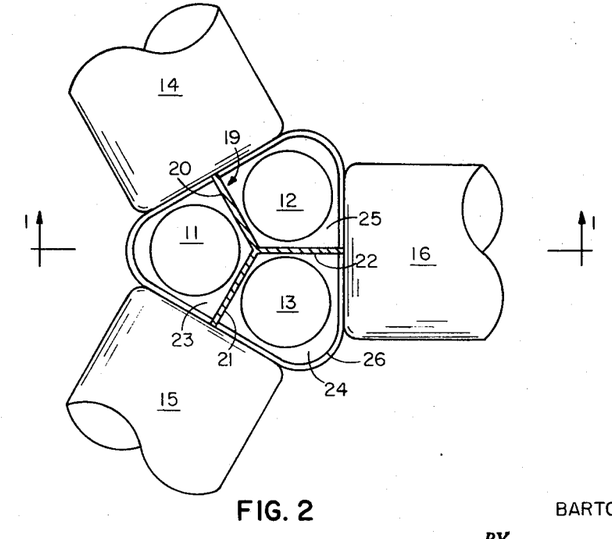
FIG. 2 is a sectional plan view taken along the lines 2—2 of a portion of the liquid scintillation counting apparatus of FIG. 1.

Referring now to FIGS. 1 and 2 there is shown a portion of a batch sample liquid scintillation counting apparatus. A counting chamber 10 is defined within a housing 41 and is designed to receive vials of liquid samples to be measured. Partition means 19 is comprised of vertically extending segments 20, 21, and 22, located atop elevator 30, which divide the counting chamber 10 into isolated sections 23, 24, and 25 when elevator 30 is lowered to below the level of chamber 10, as in FIG. 1. The sections 23, 24, and 25 need be isolated only from each other, and may be open at the top as illustrated in FIG. 1 as long as the walls 97 of the elevator shaft and the shutter 45 are highly light absorbent. Each of the sections 23, 24, and 25 is in visual communication with at least two and less than all of the photomultiplier tubes 14, 15, and 16. Since the partition means 19 divides the chamber 10 into at least three isolated sections, the number of necessary photomultiplier tubes equals the number of sections. That is, the liquid scintillation counting apparatus of FIGS. 1 and 2 requires first, second, and third photomultiplier tubes 14, 15, and 16 respectively. Section 23 is in visual communication with photomultiplier tubes 14 and 15 while section 24 is in visual communication with photomultiplier tubes 15 and 16. Section 25 is in visual communication with photomultiplier tubes 16 and 14. A coincidence detection means, such as the coincidence detection means 17 in FIG. 6, passes electrical pulses upon receipt of coincident electrical pulses from photomultiplier tubes 14 and 15 generated in response to a scintillation in sample 11 located in section 23 of the enclosed chamber. Similarly, the coincident detection means 17 passes electrical signals upon receipt of coincident electrical pulses from photomultiplier tubes 15 and 16 in response to a scintillation in sample 13 within section 24, and upon receipt of coincident electrical pulses from photomultiplier tubes 16 and 14 in response to a scintillation in sample 12 located in section 25. It can be seen that any two photomultiplier tubes should generate coincident pulses only when a scintillation occurs in a specific section of the counting chamber.

A conveyor system comprised of annular cylinders 46 fastened together by links 47 moves across the opening of an elevator shaft defined by the walls 97. Disks 26 are trapped within the cylinders 46 and are dragged along the upper surface 44 of the scintillation counting device. Each disk 26 has a partition means 19 comprised of vertically extending segments 20, 21 and 22. Samples 11, 12, and 13 are located between the upright segments as illustrated. At the start of each sample counting cycle a cylinder 46 is sequentially moved into position above the elevator shaft with the elevator 30 in the raised position. The elevator 30 is then lowered carrying with it a disk 26 and an associated partition means 19. The shutter 45 closes over the elevator 30 when the position means 19 is clear. When the elevator 30 is lowered, the timing means 99 of FIG. 6 allows the pulse registration means to begin recording scintillation events occurring in samples 11, 12 and 13. At the end of the timing cycle, no more events are recorded and the elevator 30 is raised and the shutter means 45 opens to allow upward passage of the elevator 30. The disk 26 is again trapped in the cylinder 46 from which it was withdrawn, and the conveyor system advances to the next sequential position. To obviate a tendency for the disk 26 to rotate with respect to the photomultiplier tubes during lowering of the elevator, the disk 26 can be slideably keyed to the walls 97 of the elevator shaft, or restrained in position with respect to the upper face of the elevator 30 in order to insure proper alignment of the chamber sections with the photomultiplier tubes.

Figure 8:
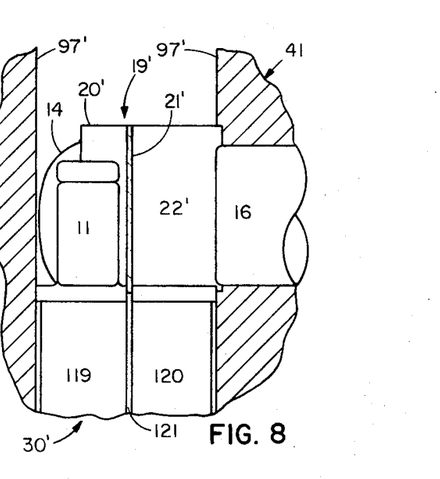
FIG. 8 illustrates an alternative embodiment to that portion of the liquid scintillation counting apparatus illustrated in FIG. 1.

An alternative embodiment of the elevator and partition means is illustrated in FIG. 8 in which housing 41' defines a chamber located below the sample conveyor system, as in FIGS. 1 and 2. In the embodiment of FIG. 8, the partition means 19' is comprised of vertically extending segments 20', 21', and 22'. These segments each extend into grooves in the walls 97' of housing 41' and are scaled thereto in the manner illustrated in connection with the segment 22'. The sements 20', 21', and 22' each extend out into the scintillation counting chamber and meet at the center thereof, thereby dividing the chamber into isolated sections as in the embodiment of FIG. 1. The elevator 30' differs from elevator 30 in that it is comprised of three separated columnar portions 119, 120, and 121, which are connected to move in tandem so that all of the elevator portions are raised and lowered in unison. Each of the elevator portions occupies the entire volume of one and only one of the single isolated chamber sections when the elevator 30' is raised. Each elevator accomodates a sample placed thereon, such as the sample 11. When the elevator portions are lowered they pass longitudinally through the chamber sections and position the samples in the chamber sections when the elevator 30' is in the fully lowered position as illustrated in FIG. 8.

Figure 3:
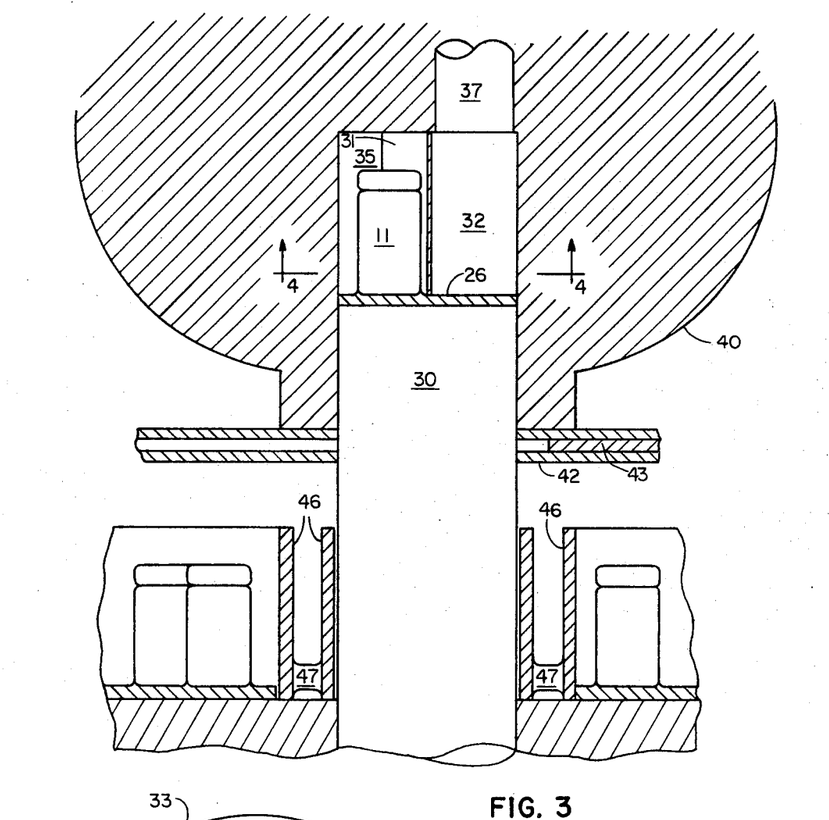
FIG. 3 is a view similar to the view of FIG. 1 of an alternative embodiment of the invention taken along the lines 3—3 of FIG. 4.
Figure 4:
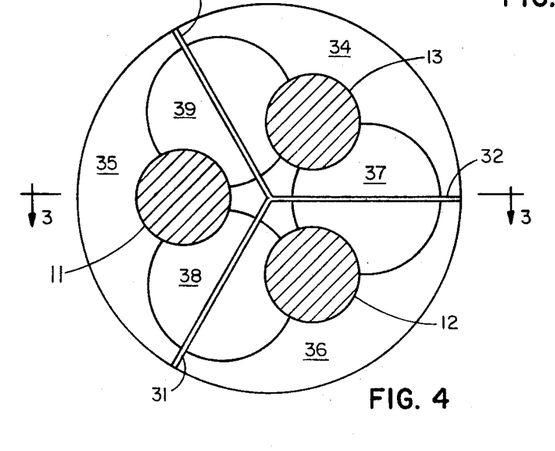
FIG. 4 is a sectional plane view taken along the lines 4—4 of FIG. 3.

Another alternative form of the invention is illustrated in FIGS. 3 and 4. In this embodiment, a liquid scintillation counting chamber housing 40 is located above the conveyor system comprised of cylinders 46 joined together by links 47. The scintillation counting chamber is located within the housing 40 and has vertically extending segments 31, 32, and 33 dividing the scintillation counting chamber into isolated sections 34, 35, and 36. The photomultiplier tubes 37, 38, and 39 are located above the isolated sections with tube 37 being in view of both sections 34 and 36, tube 39 being in view of both sections 34 and 35, and tube 38 being in view of both sections 35 and 36. At the start of each sample counting cycle, a cylinder 46 with a disk 26 having sample vials 11, 12, and 13 positioned thereon, is advanced to a position directly above elevator 30. Elevator 30 rises and passes through cylinder 46 carrying the disk 26 and the sample vials. Shutter 43 opens automatically with the upward movement of elevator 30, and the elevator 30 rises through a vertically extending elevator shaft in housing 40 that communicates with the scintillation counting chamber. Elevator 30 moves upward to contact the vertically extending segments 31, 32, and 33 of the partition means, thereby defining the isolated sections 34, 35, and 36. The samples 11, 12, and 13 are thereby positionable in separate isolated sections 35, 36, and 34 respectively. Electrical pulses are passed and received in the scintillation counter as heretofore discussed.

Figure 5:
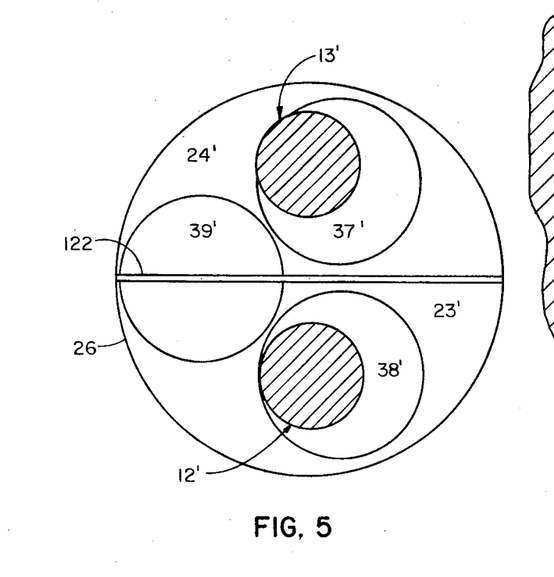
FIG. 5 is a sectional plan view of a modified form of the invention illustrated in FIG. 4.

Still another modification of this invention is illustrated in FIG. 5, which in all respects, other than those enumerated, is similar to the embodiment of FIGS. 3 and 4. The partition means 122 of FIG. 5 divides the scintillation count chamber into first and second isolated sections 23' and 24' respectively. First, second, and third photomultiplier tubes 38', 39', and 37' are positioned vertically above the isolated sections. Section 23' is in visual communication with photomultiplier tubes 38' and 39' while section 24' is in visual communication with photomultiplier tubes 39' and 37'. The coincidence detection means passes electrical pulses upon receipt of coincident electrical pulses from photomultiplier tubes 38' and 39' which are generated in response to a scintillation from sample 12' in section 23' of the chamber. Similarly, electrical pulses are passed upon receipt of coincident electrical pulses from photomultiplier tubes 39' and 37' generated in response to a scintillation in sample 13' located in section 24' of the chamber. It can be seen that in this embodiment the number of photomultiplier tubes must exceed the number of samples being analyzed simultaneously. Whenever the chamber is divided into three or more sections, the requisite number of photomultiplier tubes need only be equal to the number of isolated sections.

Figure 6:
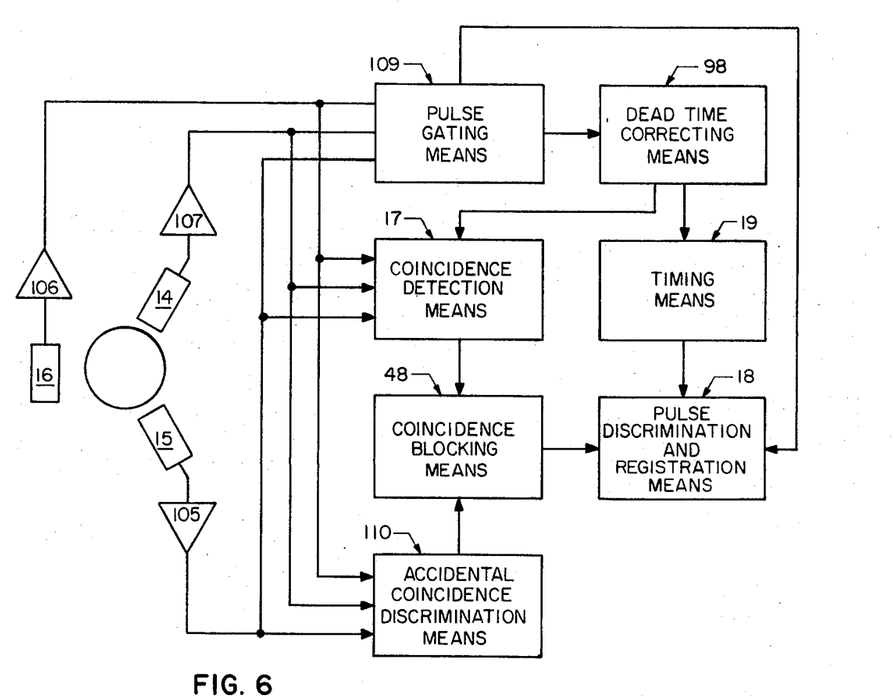
FIG. 6 is a block diagram of the liquid scintillation counting apparatus of FIGS. 1 and 2.
Figure 7:
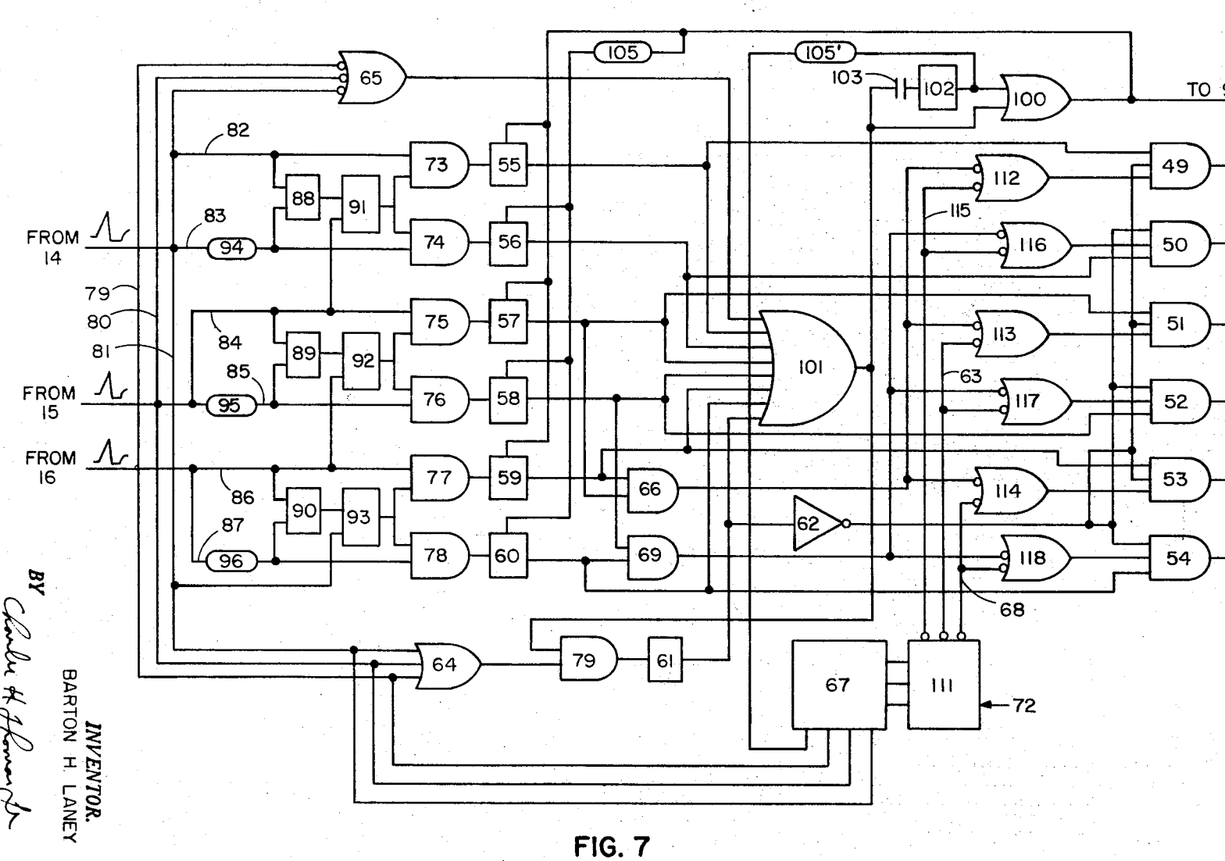
FIG. 7 illustrates in more detail the electrical connections in the liquid scintillation counting apparatus of FIG. 6.

Various preferred features of electrical processing are also desirable in the liquid scintillation counting apparatus of this invention. These are illustrated in FIGS. 6 and 7, which depict the electrical network used in the embodiment of FIGS. 1 and 2. The electrical pulses from the photomultiplier tubes 14, 15, and 16 are passed through preamplifiers 107, 108, and 106 respectively associated therewith. The pulses are passed to a coincidence detection means 17 and through a pulse gating means 109 to a dead time correcting means 98. The coincidence detection means 17 is coupled to the photomultiplier tubes for passing electrical pulses only when coincident electrical pulses are received from all of the photomultiplier tubes in visual communication with a single isolated section of the scintillation counting chamber. A pulse discrimination and registration means 18 is connected to the coincidence detection means 17 for recording pulses received therefrom. While a pulse discrimination means is not necessary to the operability of this invention, it is normally provided in order to define "windows" of pulse amplitude within which the most meaningful pulses are most likely to occur. The pulse discrimination and registration means 18 also includes a scaler or other conventional data output device.

A coincidence blocking means 48, which in the embodiment illustrated is a triple coincidence blocking means, is interposed between the coincidence detection means 17 and the pulse discrimination and registration means 18 for blocking pulses from the coincidence detection means 17 resulting from pulses received by the coincidence detection means 17 from all of the photomultiplier tubes 14, 15, and 16. As will be explained in connection with FIG. 7, the coincidence blocking means 48 is adapted for selective blocking of pulses received.

The dead-time correcting means 98 is used to correct the scintillation counting apparatus for scintillations missed when the coincidence detection means is unavailable for processing new electrical pulses from the photomultiplier tubes because it is already engaged in processing prior electrical pulses therefrom. A timing means 99 is connected to the pulse discrimination and registration means 18 for governing the real time interval within which pulses are received by the pulse discrimination and registration means 18. The pulse gating means 109 detects single or coincidence pulses in any of the photomultiplier tubes and transmits these pulses to the dead time correcting means 98 and the pulse discrimination and registration means 18. The dead time correcting means 98 is connected to the timing means 99, the pulse gating means 109, and the coincidence detection means 17 and is utilized to prevent the recordation of pulses in the pulse registration means during processing of prior pulses from the photomultiplier tubes. The dead time correcting means also corrects the timing means to compensate for the time elapsed during which recordation of pulses is prevented in the pulse discrimination and registration means 18.

One further feature of the embodiment illustrated is the accidental coincidence discrimination means 110 which is connected generally parallel with the coincidence detection means and is used to separately register in pulse discrimination and registration means 18, accidentally coincident pulses from the photomultiplier tubes reproduced on a statistical basis.

A detailed description of the operation of the electrical components is depicted in FIG. 7. The pulse registration means is comprised in part of total scintillation counting AND gates 49, 51, and 53 for each possible combination of two photomultiplier tubes. In addition, the pulse registration means includes similar AND gates 50, 52, and 54 paralleling the total scintillation counting AND gates and used for counting accidentally coincident pulses from the photomultiplier tubes. The AND gates 49 through 54 are only the initial portion of the pulse registration means. Other pulse registration means also includes a scalar or the output device, which, along with the pulse discrimination means, is conventional and therefore not illustrated. The coincidence detection means has coincidence activated monostable multivibrator means 55, 57, and 59 equipped with disabling mechanisms and associated with each possible combination of two photomultiplier tubes for providing input signals of predetermined duration to the scintillation counting AND gates. That is, monostable multivibrator 55 is associated with coincident pulses from tubes 14 and 15 while monostable multivibrator 57 is associated with coincident pulses from tubes 15 and 16. The monostable multivibrator 59 is associated with coincident pulses from tubes 16 and 14. In a similar fashion, monostable multivibrator 56 for accidental pulses is associated with accidental coincident pulses from tubes 14 and 15. Monostable multivibrator 58 is associated with accidental coincident pulses from tubes 15 and 16 while monostable multivibrator 60 is associated with accidental coincident pulses from tubes 16 and 14. The pulse gating means 109 has a pulse detection means comprised of an OR gate 64 and an inverted input OR gate 65 for detecting pulses of either polarity from the photomultiplier tubes. Normally the pulses of the magnitude desired are produced by the photomultiplier tubes with a positive spike followed by a decaying negative component, as illustrated in FIG. 7. Forming a part of the pulse gating means 109 and associated with the OR gate 64 is a gating monostable multivibrator means 61 having a prevent-start means, and a pulse inverting amplifier 62, which serves as a signal inverting means. OR gates 64 and 65, multivibrator means 61, and inverting amplifier 62 are connected to all of the photomultiplier tubes 14, 15, and 16, and provide inhibiting gating pulses of predetermined duration to the total scintillation counting AND gates 49, 51, and 53. These inhibiting gating pulses are introduced to allow time for the pulse height analysis circuitry in pulse discrimination and registration means 18 to function, and terminate prior to the termination of output signals from the multivibrator means 55, 57, and 59. Similarly, inhibiting gating pulses are provided to the accident counting AND gates 50, 52, and 54. These inhibiting gating pulses are of predetermined duration and terminate prior to the termination of the input signals from the multivibrator means 56, 58, and 60 which are associated with accidental coincident pulses. The outputs of the total coincidence activated monostable multivibrator means, 55, 57, and 59, and the outputs of the accidental coincidence monostable multivibrator means 56, 58, and 60, as well as the outputs of OR gate 65 and gating monostable multivibrator means 61 are all connected to the inputs of a dead time activating OR gate 101. OR gate 101 has one output to the prevent-start means of multivibrator means 61. This prevent-start means takes the form of an AND gate 79 operated through an output connection from the dead time activating OR gate 101. OR gate 101 also has an output to the dead time correcting means comprised of a time control OR gate 100, a reset monostable multivibrator means 102, and a capacitor 103. The time control OR gate 100 has one input lead from the dead time activating OR gate 101 and has outputs to the timing means 99 and to the disabling mechanisms on the coincidence activated monostable multivibrator means 55 through 60. The reset monostable multivibrator means 102 has an output gating lead to the time control OR gate 100, and capacitor 103 is connected between the dead time activating OR gate 101 and the reset monostable multivibrator means 102.

The triple coincidence blocking means has pulse registration inhibiting means interposed between the coincidence detection means and the pulse registration means. The pulse registration inhibiting means is comprised of a triple coincidence AND gate 66 having inputs from the outputs of at least two of the total coincidence activated monostable multivibrator means and having an output leading to inputs to OR gates 112, 113, and 114 which serve as enabling gating means. The OR gates 112, 113, and 114 all have inverted inputs so that they are always in an enabling condition unless triple coincidence pulses are simultaneously generated in photomultiplier tubes 14, 15, and 16. Even if a triple coincidence occurs, one of the OR gates 112, 113, and 114 connected to the total scintillation counting AND gates 49, 51, and 53 respectively, may be placed in an enabling condition by the selective blocking modification to be described later. In any event, if triple coincidence occurs, no more than one of the OR gates 112, 113, and 114 will be allowed to remain in an enabling condition and at least the other two OR gates will be switched to a disabling condition. In a like manner triple coincidence AND gate 69 associated with accidental coincidences is connected to the outputs of at least two of the accidental coincidence activated monostable multivibrators, and enabling OR gates 116, 117, and 118 respectively, are connected to the accident counting AND gates 50, 52, and 54.

The triple coincidence blocking means is modified for selective blocking in order to detect triple coincidence pulses resulting from reflections between photomultiplier tubes and to allow the primary coincident pulses to be recorded while rejecting the third reflected pulse. In this way, coincident pulses on two of the photomultiplier tubes are detected and recorded despite the pulse resulting from a light reflection in the other tube, which would otherwise cause all pulses to be rejected as being triple coincident. To achieve selective blocking, a differential amplitude measuring means 67 for measuring the amplitude difference between the largest pulse and the intermediate pulse and for measuring the difference between the intermediate pulse and the smallest pulse produced by the photomultiplier tubes is connected to all three photomultiplier tubes. Differential amplitude measuring means 67 generates a difference signal proportional to the difference between the intermediate and smallest pulses, and passes this difference signal to comparator means 111. Comparator means 111 contains a control signal set by control signal adjustment 72 and proportional to a predetermined minimum difference value which is calculated to distinguish and identify small reflected pulses in the presence of primary pulses resulting from a true scintillation. Comparator 111 compares the difference signal from measuring means 67 against the control signal set at 72 and, if appropriate, selectively generates and passes a signal to either the enabling OR gates 112 and 116, OR gates 113 and 117, or OR gates 114 and 118. A signal is generated only when the difference signal from measuring means 67 is at least as large as the control signal in comparator 111. If generated, the signal is inverted and passed only to those enabling OR gates connected to the total and accidental monostable multivibrators associated with the largest and intermediate pulses from the photomultiplier tubes. If the difference signal from the measuring means 67 is smaller than the control signal set at 72, then no signal is passed from comparator 111 to any of the enabling OR gates. In this instance all of the total enabling OR gates or all of the accidental enabling OR gates will switch to a disabling condition because of the occurrence of either a total triple coincidence or an accidental triple coincidence. For example, if a triple coincidence occurs and the pulse from photomultiplier tube 15 results from a reflected scintillation and is much smaller than the pulses from tubes 14 and 16, then signal is passed from comparator 111 to OR gates 114 and 118, thereby maintaining these OR gates in an enabling condition and allowing the pulse from multivibrator 59 to cause a scintillation count to be recorded by AND gate 53. AND gate 66 causes the other enabling OR gates to switch to a disabling condition and block recordation of pulses by AND gates 49, 50, 51, and 52. After each pulse processing, the differential amplitude measuring means 67 is reset by reset multivibrator means 102. Pulse delay means 105', equal to pulse delay means 105, is interposed in the reset line between differential amplitude measuring means 67 and multivibrator means 102. This is because the timing of the resetting of measuring means 67 must be synchronized with the delay introduced by the summing means 88, 89, and 90 and the pulse delay means 94, 95, and 96, yet to be described.

Several additional components are also required for accidental coincidence pulse registration. These include normal pulse AND gates 73, 75, and 77 associated with photomultiplier tubes 14, 15, and 16 respectively, and delayed pulse AND gates 74, 76, and 78 associated with photomultiplier tubes 14, 15, and 16 respectively. The normal pulse AND gates and the delayed pulse AND gates have outputs respectively operating the total pulse monostable multivibrators and the accidental pulse monostable multivibrators. First and second input leads 82 and 83 respectively gate the normal pulse AND gate 73 and the delayed pulse AND gate 74 associated with photomultiplier tube 14. Similarly, first and second input leads 84 and 85 respectively gate AND gates 75 and 76 while first input lead 86 and second input lead 87 respectively gate AND gates 77 and 78. The summing means 88, 89, and 90 are each respectively connected across the first and second input leads from photomultiplier tubes 14, 15, and 16. Coincidence detectors 91, 92, and 93 are provided for each possible combination of two photomultiplier tubes with an output from each coincidence detector gating the normal pulse AND gate and the delayed pulse AND gate associated with one of the photomultiplier tubes. One input is provided to the same coincidence detector from the summing means associated with that same photomultiplier tube, and another input is provided to each coincidence detector from the first input lead of one of the remaining photomultiplier tubes. That is, coincidence detector 91 gates normal pulse AND gate 73 and delayed pulse AND gate 74 and has one input from summing means 88. Summing means 88, and AND gates 73 and 74 are all associated with photomultiplier tube 14. The other input to coincidence detector 91 extends from the first input lead 84 of photomultiplier tube 15. Similar connections are repeated for each of the other possible combination of any two of the photomultiplier tubes. A pulse delay means is interposed in each of the second input leads between the photomultiplier tube and the summing means associated therewith. More particularly, pulse delay means 94 is located in second input lead 83 between photomultiplier tube 14 and summing means 88; pulse delay means 95 is located in second input lead 85 between photomultiplier tube 15 and summing means 89; and pulse delay means 96 is located in second input lead 87 between photomultiplier tube 16 and summing means 90. By using the same coincidence detection circuitry for both total and accidental pulses, problems of varying accuracy, thresholds, and balancing in the circuit components are obviated. As previously mentioned, the OR gate 64 and the inverted input OR gate 65 detect single pulses, accidentally coincident pulses, and total coincident pulses. The monostable multivibrator 61 operates the signal inverting amplifier 62 associated with the pulse registration AND gates 49, 50, 51, 52, 53, and 54.

The operation of the embodiment of the invention depicted in FIG. 7 may be further illustrated by an analysis of the circuit conditions upon receipt of different pulses. Normally, coincident input pulses from any two photomultiplier tubes are both initially positive going pulses, either one or both of which cause current to pass through OR gate 64. If coincident pulses are generated by photomultiplier tubes 14 and 15 as a result of a scintillation in sample vial 11 in section 23, the fact that the pulses are coincident causes coincidence detector 91 to gate AND gate 73 and operate monostable multivibrator 55 which in turn insures that current eminates from OR gate 101. The output of OR gate 101 gates AND gate 79, which combined with the input from OR gate 64, begins the cycle of an inhibiting pulse as initiated by monostable multivibrator 61. The pulse from multivibrator 61 is passed to pulse inverting amplifier 62 which inverts the pulse thereby creating an inhibiting pulse which prevents the AND gate 49 from passing current for a predetermined period of time. During the time the current is passed from AND gate 79, monostable multivibrator 61 is prevented from starting the cycle again so that once the timed inhibited condition of the input lead of AND gate 49 has expired, a gating current is returned to that lead and AND gate 49 is in a condition to accept gating pulses on its other input leads and thereafter pass current. If coincidence is present between tubes 14 and 15, the monostable multivibrator 55 will generate a gating pulse having a longer duration than the inhibit pulse initiated by monostable multivibrator 61. This will cause AND gate 49 to conduct current once the inhibit pulse from multivibrator 61 has expired, assuming, of course, that a triple coincidence has not occurred. A scintillation count is thereby registered.

Other events are also occurring in other parts of the circuit simultaneously with the pulse registration. The generation of single or coincident pulses, as previously mentioned, causes the dead time activating OR gate 101 to conduct current. Besides contributing to the activation of multivibrator 61, OR gate 101 activates OR gate 100 which provides a dead time signal for at least the duration of the operating interval of multivibrator 61. When the pulses from the photomultiplier tubes terminate and there are no longer any inputs to OR gate 101 (which will occur no sooner than after the termination of the inhibit signal from multivibrator 61 or after the termination of the output signal from the coincidence activated multivibrator 55 if there is pulse coincidence), current will cease to flow to OR gate 100 from OR gate 101. When OR gate 101 is turned off at the end of a dead time interval, reset multivibrator 102 is turned on by the discharge of capacitor 103. The output of multivibrator 102 keeps OR gate 100 turned on for the duration of a predetermined reset interval as internally controlled within reset multivibrator 102. The length of the reset interval is selected in accordance with the requirements of the pulse height analysis circuitry in pulse discrimination and registration means 18, and is provided to insure that all circuit components are ready to analyze another input pulse. A dead time signal is thus generated for the total length of the operation of OR gate 101 plus the length of the operating period of multivibrator 102. The output of OR gate 100 prevents the coincidence activated monostable multivibrators 55, 57, and 59 from being activated by acting through the disabling mechanisms therein. The output from OR gate 100, after a delay introduced by pulse delay means 105 similarly deactivates the accident coincidence activated monostable multivibrators 56, 58, and 60. It should be noted that the delay introduced by pulse delay means 105 must be at least as great as the delay introduced by the pulse delay means 94, 95, and 96. The output of OR gate 100 is also conducted to the timer to stop the timing means 99 from running during the dead time interval in which the circuitry is unavailable to accept new pulses from the photomultiplier tubes. Unavailability of the electrical components to accept pulses during processing of previous pulses need thereby no longer be a source of error in liquid scintillation coincidence counting.

Upon receipt of triple coincident pulses, the differential amplitude measuring means 67 determines the amplitude differences between the pulses received. If a true scintillation occurred in chamber 23, and primary pulses were initiated by tubes 14 and 15 but a secondary pulse resulting from light reflected from one of the other photomultiplier tubes was also produced by tube 16, the differential amplitude measuring means 67 will determine the amplitude difference between the largest and intermediate pulses and between the intermediate and smallest pulses. The pulses from tubes 14 and 15 will be nearly equal and will be much larger than the pulse from tube 16. Assuming that the pulse from tube 14 is slightly larger than that from tube 15, the differential amplitude measuring means 67 will generate a difference signal proportional to the difference between pulses from tubes 15 and 16. If the amplitude difference is large, as it will be when one of the signals, such as the signal from tube 16, is a result of a light reflection, the difference signal produced will be larger than a predetermined control signal set at 72 in comparator 111. A signal will be generated by comparator 111 and this signal will be inverted and passed to the enabling OR gates associated with coincidences between the tubes generating the two largest pulses. In this example, the signal will be passed from comparator 111 to the enabling OR gates 112 and 116. This signal will cause OR gates 112 and 116 to remain in an enabling condition while OR gates 113 and 114 will switch to a disabling condition if a triple coincidence occurs in the pulses generated by tubes 14, 15, and 16. Similarly, OR gates 117 and 118 will be placed in a disabling mode if a triple coincidence occurs as detected by accident coincidence activated monostable multivibrators 56, 58, and 60. If, on the other hand, the difference signal from differential measuring means 67 is smaller than the control signal, comparator 111 will generate no signals and the OR gates 112, 113, and 114 will be switched to a disabling condition by the detection of the triple coincidence as transmitted by AND gate 66. AND gate 66 will be in a conducting state since, if a triple coincidence occurs, both of the multivibrators 57 and 59 will be conducting, thereby activating AND gate 66. Similarly, AND gate 69 will be activated by multivibrators 58 and 60 if an accidental coincidence occurs and the OR gates 116, 117 and 118 will switch to a disabling mode. It can be seen that the total triple coincidence AND gate 66 could be connected to any two or all of the total coincidence activated monostable multivibrators 55, 57, and 59. Similarly, accident triple coincidence AND gate 69 can be connected to any two or more of the accident coincidence activated multivibrators 56, 58, and 60.

The operation of the accidental coincidence detection feature may be further explained by referring back to the situation where a scintillation occurred in the sample vial 11 in section 23, and coincident pulses were produced by photomultiplier tubes 14 and 15. The pulse from tube 14 passes through first and second input leads 82 and 83 to summing means 88. The output of summing means 88 includes two pulses for every pulse received from photomultiplier tube 14. These pulses are sequentially arranged in time because of the delay introduced by the pulse delay means 94 in the pulse passing through the second input lead 83. Pulse delay means 94 should be chosen so as to introduce a delay which will not coincide with the delay inherent in normal after-pulsing in existing photomultiplier tubes, for an improper choice will result in the recordation of an inordinately large number of after-pulses rather than the random spurious pulses desired. Pulse delay means 94, therefore, should introduce a delay less than about 200 nanoseconds or greater than about 2 microseconds in order to avoid the ordinary after-pulsing period. The sequential pulses generated by summing means 88 pass from summing means 88 to coincidence detector 91. The coincidence detector 91 is activated by the first pulse from summing means 88 and by the coincident pulse from tube 15 conducted via first input lead 84 to coincidence detector 91. The output of coincidence detector 91 coincides with the pulse from tube 14 on first input lead 82. These two pulses activate AND gate 73 which initiates the timed pulse on monostable multivibrator 55. This results in an output counting pulse from AND gate 49. as previously described. When the second pulse from summing means 88 arrives at coincidence detector 91, the accident coincidence activated multivibrator 56 will be operated only if there is an output from coincidence detector 91. This will occur only if a single stray pulse is generated by tube 15 after the original coincident pulses from tubes 14 and 15, and only if this stray pulse accidentally coincides in time with the second pulse from summing means 88. In this instance, AND gate 74 will be gated and accidental coincidence activated multivibrator 56 will generate a pulse and an accident count will be registered at AND gate 50 as previously described. It will be apparent that from a probability standpoint it is just as likely that a stray accidental unrelated pulse will be generated by tube 15 to coincide with the first pulse eminating from summing means 88 and appearing at AND gate 73 as it is for such a pulse to coincide with the duplicate pulse eminating from summing means 88. While the probability of the occurrence of these accidentally coincident events are the same, they are recorded differently. In the first instance, the unrelated pulses in tubes 14 and 15 are mistakenly identified as a scintillation and recorded at AND gate 49. In the second instance, however, the pulses are recognized as being only accidentally coincident and are registered at AND gate 50. The output of AND gate 49, therefore, should be considered to be representative of the total sum of actual scintillations and accidentally coincident pulses. The output of AND gate 50 should then be considered as representative of only accidental pulses. The total actual scintillations may be computed merely by subtracting the count of AND gate 50 from that of AND gate 49. This subtraction may be made either automatically or manually.

The detailed descriptions and illustrations of the preferred embodiments depicted herein have been given for purposes of illustration only, and no unnecessary limitations should be construed therefrom. For example, conventional electrical components may be substituted for those depicted herein to carry out the essential functions of this invention. Moreover, other embodiments and utilizations will be apparent to those familiar with the field of this invention. For example, external standardization may be employed using the multisample simultaneous analysis described herein. Also, it will be apparent that corresponding circuit conditions will exist where coincidence occurs between pulses from tubes 15 and 16 or tubes 16 and 14, rather than the coincidence between pulses from tubes 14 and 15 as described in connection with the illustrations.

It will be obvious to those familiar with liquid scintillation coincidence counting that programmable digital equipment can be substituted for much of the analogue circuitry depicted in the diagrams. For example, the selective blocking means depicted in the drawings could very easily be constructed in the form of programmable digital equipment.

I claim as my invention

1. In a liquid scintillation coincidence counting apparatus comprising a counting chamber for receiving samples to be measured, photomultiplier tubes located adjacent to said chamber for producing electrical pulses responsive to energy received from scintillations occurring in the samples, coincidence detection means coupled to said photomultiplier tubes for passing electrical pulses when coincident pulses are received from at least two of said photomultiplier tubes, and pulse registration means connected to said coincidence detection means for recording pulses received therefrom, the improvement wherein partition means divide said chamber into at least two isolated sections and each of said isolated sections of said chamber simultaneously accomodates a separate sample and is in visual communication with at least two and less than all of said photomultiplier tubes, and said coincidence detection means passes electrical pulses only when coincident electrical pulses are received from all of the photomultiplier tubes in visual communication with a single isolated section of said chamber.

2. The liquid scintillation counting apparatus of claim 1 further characterized in that said partition means divides said chamber into first and second isolated sections, and said first section is in visual communication with first and second photomultiplier tubes, and said second section is in visual communication with said second photomultiplier tube and a third photomultiplier tube, and said coincidence detection means passes electrical pulses upon receipt of coincident electrical pulses from said first and second photomultiplier tubes generated in response to a scintillation from a sample in said first section of the said chamber and upon receipt of coincident electrical pulses from said second and third photomultiplier tubes generated in response to a scintillation from a sample in said second section of said chamber.

3. The liquid scintillation counting apparatus of claim 1 wherein said partition means divides said chamber into a predetermined number of isolated sections, and the same number of photomultiplier tubes are in visual communication with said sections and each photomultiplier tube is in visual communication with each of two different sections, and each of said sections is in visual communication with two different photomultiplier tubes.

4. The liquid scintillation counting apparatus of claim 3 wherein a coincidence blocking means is interposed between said coincidence detection means and said pulse registration means for blocking pulses from said coincidence detection means resulting from pulses received by the coincidence detection means from photomultiplier tubes lacking visual communication with a common isolated section.

5. The liquid scintillation counting apparatus of claim 3 wherein said partition means divides said chamber into first, second, and third sections, and said first section is in visual communication with first and second photomultiplier tubes, said second section is in visual communication with said second photomultiplier tube and a third photomultiplier tube, and said third section is in visual communication with said third and first photomultiplier tubes, and said coincidence detection means passes electrical pulses upon receipt of coincident electrical pulses from said first and second photomultiplier tubes generated in response to a scintillation from a sample in said first section, upon receipt of coincident electrical pulses from said second and third photomultiplier tubes in response to a scintillation from a sample in said second section, and upon receipt of coincident electrical pulses from said third and first photomultiplier tubes in response to a scintillation from a sample in said third section.

6. The liquid scintillation counting apparatus of claim 5 wherein a triple coincidence blocking means is interposed between said coincidence detection means and said pulse registration means for blocking pulses from said coincidence detection means resulting from pulses received by said coincidence detection means from all three of the photomultiplier tubes.

7. The liquid scintillation counting apparatus of claim 6 wherein:
   a. said pulse registration means is comprised of a scintillation counting AND gate for each possible combination of two photomultiplier tubes,
   b. said coincidence detection means has coincidence activated monostable multivibrator means associated with each possible combination of two photomultiplier tubes for providing input signals of predetermined duration to said scintillation counting AND gates,
   c. a pulse detection means and signal inverting means are connected to all of said photomultiplier tubes and provide inhibiting gating pulses of predetermined duration to said scintillation counting AND gates, and said inhibiting pulses terminate prior to the termination of said input signals,
   d. enabling gating means normally in an enabling condition connected to the inputs of said scintillation counting AND gates, and
   e. said triple coincidence blocking means is comprised of a triple coincidence AND gate having inputs connected to the outputs of at least two of said coincidence activated monostable multivibrator means and having an output leading to an input of the aforesaid enabling gating means for switching said enabling gating means to a disabling condition.

8. The liquid scintillation counting apparatus of claim 6 further characterized in that said triple coincidence blocking means is modified for selective blocking and has differential amplitude measuring means for measuring the amplitude difference between the largest and intermediate pulses and between the intermediate and smallest pulses produced by said photomultiplier tubes and for generating a difference signal proportional to the difference between the aforesaid intermediate and smallest pulses, and comparator means for comparing said difference signal against a control signal proportional to a predetermined minimum difference value and for selectively passing signals to said means for allowing said enabling gating means to block those pulses from said coincidence detection means that result from pulses from all three of the photomultiplier tubes where the aforesaid difference signal is less than said control signal, and for passing that pulse from said coincident detection means that results from the largest and intermediate pulses from the photomultiplier tubes where the aforesaid difference signal is at least as large as said control signal.

9. The liquid scintillation counting apparatus of claim 1 further comprising an accidental coincidence discrimination means for separately registering, in said pulse registration means, accidentally coincident pulses from said photomultiplier tubes reproduced on a statistical basis.

10. The liquid scintillation counting apparatus of claim 9 wherein:
 a. three photomultiplier tubes are utilized,
 b. said pulse registration means is comprised of a total scintillation counting AND gate and an accident counting AND gate for each possible combination of two photomultiplier tubes,
 c. separate coincidence activated monostable multivibrator means for total pulses and for accidental pulses are associated with each possible combination of two photomultiplier tubes for providing input signals to said total scintillation counting and accident counting AND gates respectively in response to coincident pulses,
 d. a normal pulse AND gate and a delayed pulse AND gate associated with each photomultiplier tube have outputs operating a total pulse monostable multivibrator and an accidental pulse monostable multivibrator respectively,
 e. first and second input leads from each photomultiplier tube respectively gate said normal pulse AND gate and said delayed pulse AND gate,
 f. a summing means is connected across the first and second input leads from each photomultiplier tube,
 g. coincidence detectors are provided for each possible combination of any two photomultiplier tubes with an output from a coincidence detector gating the normal pulse AND gate and the delayed pulse AND gate associated with one of the photomultiplier tubes and with one input to the same coincidence detector from the summing means associated with that same photomultiplier tube and with another input to the same coincidence detector from the first input lead of one of the other photomultiplier tubes,
 h. a pulse delay means interposed in each of said second input leads between the photomultiplier tube and the summing means associated therewith, and
 i. pulse gating means for detecting pulses in said photomultiplier tubes and for gating said total scintillation counting AND gates and said accident counting AND gates.

11. A batch sample liquid scintillation counting apparatus comprising:
 a. a housing defining a counting chamber for receiving samples to be measured,
 b. photomultiplier tubes located adjacent to said chamber for producing electrical pulses responsive to energy received from scintillations occurring in the samples to be measured,
 c. partition means dividing said chamber into a plurality of isolated sections, each section accomodating a sample, and each section being in visual communication with at least two and less than all of said photomultiplier tubes,
 d. coincidence detection means coupled to said photomultiplier tubes for passing electrical pulses only when coincident electrical pulses are received from all of the photomultiplier tubes in visual communication with a single isolated section of said chamber, and
 e. pulse registration means connected to said coincidence detection means for recording pulses received therefrom.

12. The batch sample liquid scintillation counting apparatus of claim 11 wherein said partition means is comprised of vertically extending segments located atop an elevator, and said elevator accomodates samples positioned between said partition segments which divide said chamber into sections when said elevator is lowered to below the level of said chamber.

13. The batch sample liquid scintillation counting apparatus of claim 11 wherein said partition means is comprised of vertically extending segments sealed to said housing and extending into said chamber, and dividing said chamber into the aforesaid isolated sections and said elevator is comprised of separated columnar portions movable in tandum each fully occupying a single isolated section when said elevator is raised and each accomodating a sample placed atop thereof for positioning in said isolated sections of said chamber when said elevator is lowered.

14. The batch sample liquid scintillation counting apparatus of claim 11 wherein said partition means is comprised of vertically extending segments, and said chamber has a vertically extending elevator shaft in communication therewith, and an elevator accomodates samples positioned thereon and is movable upward to contact said vertically extending segments, thereby defining the aforesaid isolated sections, whereby samples positioned atop said elevator are positionable in separate isolated sections of said chamber.

15. The batch sample liquid scintillation counting apparatus of claim 11 further comprising a timing means connected to said pulse registration means for determining the time interval within which pulses are received by said pulse registration means, and a pulse gating means is connected to all of said photomultiplier tubes, and a dead time correcting means is connected to said timing means, said pulse gating means, and said coincidence detection means for temporarily preventing the recordation of pulses in said pulse registration means during processing of prior pulses from said photomultiplier tubes, and for correcting said timing means to compensate for the time elapsed during which recordation of pulses is prevented.

16. The batch sample liquid scintillation counting apparatus of claim 14 further characterized in that:
  a. said pulse registration means is comprised of scintillation counting AND gates for each possible combination of two photomultiplier tubes,
  b. said coincidence detection means has coincidence activated monostable multivibrator means equipped with disabling mechanisms associated with each possible combination of two photomultiplier tubes for providing input signals of predetermined duration to said pulse registration means,
  c. a dead time activating OR gate is additionally connected to the outputs of said coincidence activated monostable multivibrator means,
  d. said pulse gating means is further comprised of: (i) pulse inverting means for providing inhibiting gating pulses of predetermined duration to said scintillation counting AND gates and said inhibiting pulses terminate one input lead from said dead time activating OR gate and with outputs to said timing means and said disabling mechanisms of said coincidence activated monostable multivibrator means, (ii) a reset monostable multivibrator means having an output gating lead to said time control or gate, and (iii) a capacitor connected between said dead time activating OR gate and said reset monostable multivibrator means.

* * * * *